United States Patent
Peddibhotla et al.

(10) Patent No.: US 11,314,611 B2
(45) Date of Patent: Apr. 26, 2022

(54) UNIVERSAL IDENTITY MANAGEMENT OR GOVERNANCE OVER APPLICATIONS

(71) Applicant: Oracle International Corporation, Redwood Shores, CA (US)

(72) Inventors: Sudhakar Suryanarayana Peddibhotla, San Ramon, CA (US); Sridhar Venkatakrishnan, Stuttgart (DE); Pavlo Bereza, San Jose, CA (US); Michael Patrick Dugan, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 272 days.

(21) Appl. No.: 16/657,030

(22) Filed: Oct. 18, 2019

(65) Prior Publication Data
US 2020/0125468 A1    Apr. 23, 2020

Related U.S. Application Data

(60) Provisional application No. 62/747,896, filed on Oct. 19, 2018.

(51) Int. Cl.
*G06F 16/00* (2019.01)
*G06F 11/30* (2006.01)
(Continued)

(52) U.S. Cl.
CPC ........ *G06F 11/3079* (2013.01); *G06F 16/219* (2019.01); *G06F 16/2423* (2019.01); *G06F 16/2448* (2019.01)

(58) Field of Classification Search
CPC ............. G06F 11/3079; G06F 16/2448; G06F 16/219; G06F 16/2423
(Continued)

(56) References Cited

U.S. PATENT DOCUMENTS

| 5,694,595 | A | 12/1997 | Jacobs et al. |
| 7,512,588 | B2 * | 3/2009 | Chou .................. G06F 16/2471 |
| | | | 707/999.005 |

(Continued)

FOREIGN PATENT DOCUMENTS

EP    1122652    8/2001

OTHER PUBLICATIONS

Haas et al., IBM Federated Database Technology, IBM, Available online at http://www.ibm.com/developerworks/db2/1library/techarticle/0203haas/02O3haas.html, Mar. 1, 2002, 9 pages.
(Continued)

*Primary Examiner* — Jean M Corrielus
(74) *Attorney, Agent, or Firm* — Kilpatrick Townsend & Stockton LLP

(57) ABSTRACT

Techniques for identity management, and more particularly, to techniques for performing universal identity management or governance over a wide variety of applications. In one aspect a computer-implement method is provided that includes receiving a request for a query of data or a CRUD operation on the data. The data is part of a target application hosted by an enterprise. The method further includes obtaining a schema of objects associated with the target application. The schema models a relationship between the objects, and the objects represent the data of the target application. The method further includes executing the query or CRUD operation on the objects based on the schema, executing the query or CRUD operation on the data based on the schema, and reporting results of the query or CRUD operation on the data.

9 Claims, 7 Drawing Sheets

(51) Int. Cl.
*G06F 16/242* (2019.01)
*G06F 16/21* (2019.01)

(58) Field of Classification Search
USPC .......................................................... 707/722
See application file for complete search history.

(56) References Cited

U.S. PATENT DOCUMENTS

| | | | | |
|---|---|---|---|---|
| 8,615,731 | B2* | 12/2013 | Doshi | ................... G06F 8/24 |
| | | | | 717/106 |
| 8,898,147 | B2* | 11/2014 | Seitz | ................ G06F 16/24552 |
| | | | | 707/719 |
| 2007/0130206 | A1 | 6/2007 | Zhou et al. | |
| 2011/0010379 | A1 | 1/2011 | Gilderman et al. | |
| 2013/0318070 | A1 | 11/2013 | Wu et al. | |
| 2019/0294722 | A1* | 9/2019 | Mohan | ................ G06F 16/212 |
| 2019/0370370 | A1* | 12/2019 | Wittern | .................. G06F 9/54 |

OTHER PUBLICATIONS

International Application No. PCT/US2019/056916, International Search Report and Written Opinion dated Jan. 7, 2020, 11 pages.
Roth et al., Don't Scrap It, Wrap It! A Wrapper Architecture for Legacy Data Sources, Proceedings of the International Conference on Very Large Data Bases Conference, XP-000940797, Aug. 26, 1997, pp. 266-275.

* cited by examiner

UNIVERSAL IDENTITY MANAGEMENT OR GOVERNANCE OVER APPLICATIONS

CROSS-REFERENCE TO RELATED APPLICATION

This application claims priority to U.S. Provisional Application No. 62/747,896, filed on Oct. 19, 2018, the entirety of which is incorporated herein by reference.

FIELD OF THE INVENTION

The present disclosure relates generally to identity management, and more particularly, to techniques for performing universal identity management or governance over a wide variety of applications.

BACKGROUND

A modern enterprise has a large number of applications both on-premises and in cloud, that are used by employees, contractors, partners and end-consumers. Each user has certain privileges within these applications that dictates what they are allowed to do in these applications. The sum total of all privileges that all users of these system have forms the overall surface area for risk management and compliance. Excess privileges and toxic combinations of privileges can lead to compliance violation.

Identity management or governance attempts to keep enterprise customers in charge of the privilege foot print by supporting life cycle management. Some examples of life cycle management operations include: (i) supporting approval and certification of creation, modification and deletion of new entitlements (e.g., entitlement lifecycle management); (ii) supporting approval/certification and segregation of duties for creation, modification and deletion of privileges (a.k.a. entitlement grants) (e.g., access request management); and (iii) supporting approval and certification of creation of new applications, modification of existing applications and retiring applications (e.g., application life cycle management).

In order to support these and other life cycle management operations for various identity and access related entities, an identity management or governance solution is typically required to support frameworks to integrate with each of these applications. Oracle Identity Governance product, as an example, supports a large number of connectors that customers use to create these integrations.

BRIEF SUMMARY

Techniques are provided (e.g., a method, a system, non-transitory computer-readable medium storing code or instructions executable by one or more processors) for universal governance.

In various embodiments, a method is provided for that includes receiving, at a data processing system, a request for a query of data or a CRUD operation on the data, where the data is part of one or more enterprise applications. The method further includes obtaining, by the data processing system, a schema of objects associated with the one or more applications, where the schema models a relationship between the objects, and the objects represent the data of the one or more enterprise applications. The method further includes processing, by the data processing system, the query or CRUD operation based on the obtained schema. In some embodiments, the processing includes translating the query or CRUD operation into one or more schema specific calls to the one or more enterprise applications. The calls are configured to execute the query or the CRUD on the data of the one or more enterprise applications in accordance with the schema of objects. The method further includes reporting, by the data processing system, results of the query or CRUD operation to a user. In some embodiments, the reporting the query or CRUD operation includes reporting all object mutations performed on the data associated with the objects over a lifecycle of the objects.

In various embodiments, a system is provide for that includes the data processing system that includes one or more processors and non-transitory machine readable storage medium having instructions stored thereon that when executed by the one or more processors cause the one or more processors to perform the method.

In various embodiments, a non-transitory machine readable storage medium is provide for that includes instructions stored thereon that when executed by one or more processors cause the one or more processors to perform the method.

In various embodiments, a method is provided for that includes receiving, at a data processing system, a request for a query of data or a CRUD operation on the data, where the data is part of a target application. The method further includes obtaining, by the data processing system, a schema of objects associated with the target application, where the schema models a relationship between the objects, and the objects represent the data of the target application. The method further includes executing, by the data processing system, the query or CRUD operation on the objects based on the schema, executing, by the data processing system, the query or CRUD operation on the data based on the schema, and reporting, by the data processing system, results of the query or CRUD operation on the data.

In some embodiments, the executing the query or CRUD operation on the data includes translating the query or CRUD operation into one or more schema specific calls to the target application.

In some embodiments, the calls are configured to execute the query or the CRUD on the data of the target application in accordance with the schema.

In some embodiments, the reporting the results of the query or CRUD operation includes reporting all object mutations performed on the data associated with the objects over a lifecycle of the objects.

In some embodiments, the schema is an enriched version of the target application that includes additional artifacts or objects within the data processing system beyond the objects representative of the data in the target application.

In some embodiments, the method further comprises updating, by the data processing system, the schema to account for the executing the query or CRUD operation on the objects, and the executing the query or CRUD operation on the data is based on the updated schema.

In some embodiments, the schema of objects are associated with additional objects within the data processing system, and the additional objects represent information and tasks to be tracked within an enterprise.

In various embodiments, a non-transitory computer-readable memory is provided for storing a plurality of instructions executable by one or more processors, the plurality of instructions comprising instructions that when executed by the one or more processors cause the one or more processors to perform processing comprising: receiving a request for a query of data or a CRUD operation on the data, where the data is part of a target application; obtaining a schema of objects associated with the target application, where the schema models a relationship between the objects, and the objects represent the data of the target application; executing the query or CRUD operation on the objects based on the schema; executing the query or CRUD operation on the data based on the schema; and reporting results of the query or CRUD operation on the data.

In some embodiments, the executing the query or CRUD operation on the data includes translating the query or CRUD operation into one or more schema specific calls to the target application.

In some embodiments, the calls are configured to execute the query or the CRUD on the data of the target application in accordance with the schema.

In some embodiments, the reporting the results of the query or CRUD operation includes reporting all object mutations performed on the data associated with the objects over a lifecycle of the objects.

In some embodiments, the schema is an enriched version of the target application that includes additional artifacts or objects within the data processing system beyond the objects representative of the data in the target application.

In some embodiments, the processing further comprises updating the schema to account for the executing the query or CRUD operation on the objects, and the executing the query or CRUD operation on the data is based on the updated schema.

In some embodiments, the schema of objects are associated with additional objects within the data processing system, and the additional objects represent information and tasks to be tracked within an enterprise.

In various embodiments, a system is provided that comprises: one or more processors; and a memory coupled to the one or more processors, the memory storing a plurality of instructions executable by the one or more processors, the plurality of instructions comprising instructions that when executed by the one or more processors cause the one or more processors to perform processing comprising: receiving a request for a query of data or a CRUD operation on the data, where the data is part of a target application; obtaining a schema of objects associated with the target application, where the schema models a relationship between the objects, and the objects represent the data of the target application; executing the query or CRUD operation on the objects based on the schema; executing the query or CRUD operation on the data based on the schema; and reporting results of the query or CRUD operation on the data.

In some embodiments, the executing the query or CRUD operation on the data includes translating the query or CRUD operation into one or more schema specific calls to the target application.

In some embodiments, the calls are configured to execute the query or the CRUD on the data of the target application in accordance with the schema.

In some embodiments, the reporting the results of the query or CRUD operation includes reporting all object mutations performed on the data associated with the objects over a lifecycle of the objects.

In some embodiments, the schema is an enriched version of the target application that includes additional artifacts or objects within the data processing system beyond the objects representative of the data in the target application.

In some embodiments, the processing further comprises updating the schema to account for the executing the query or CRUD operation on the objects, and the executing the query or CRUD operation on the data is based on the updated schema.

In some embodiments, the schema of objects are associated with additional objects within the data processing system, and the additional objects represent information and tasks to be tracked within an enterprise The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Introduction

Figure 1:
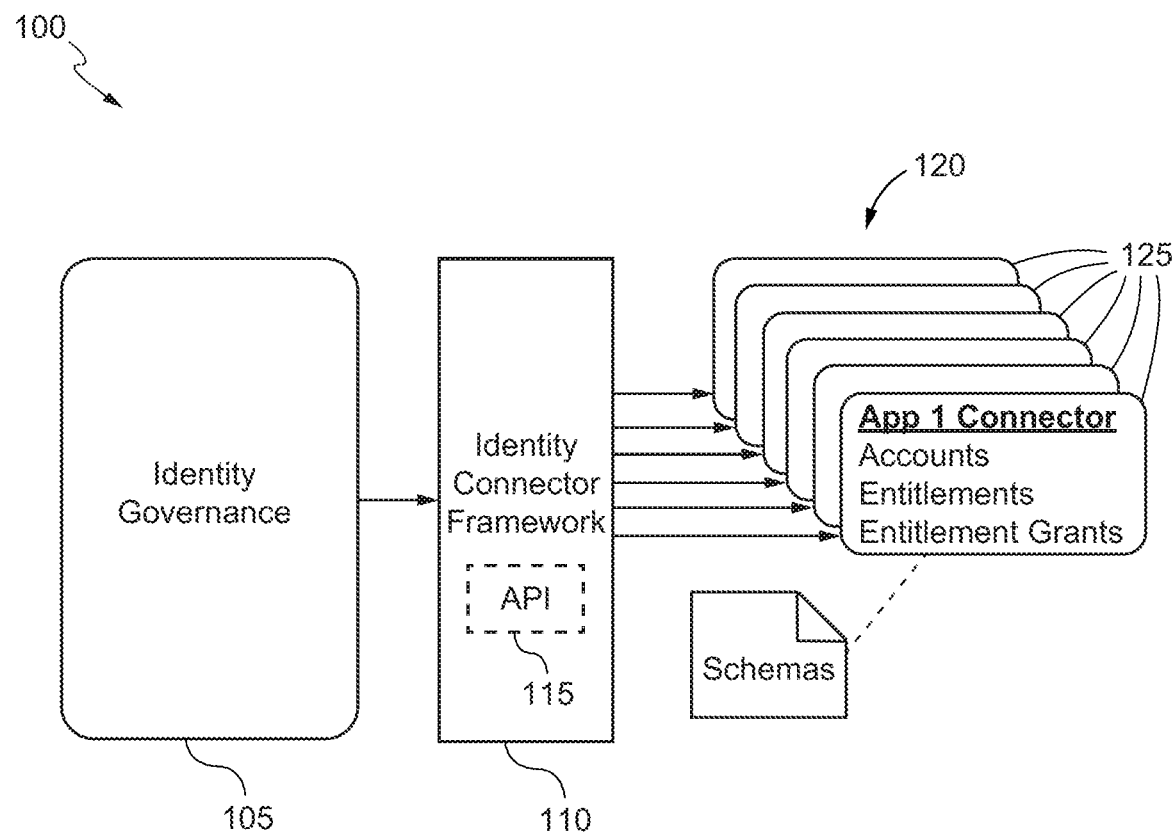
FIG. 1 is an illustration of an approach to lifecycle management.

Applications and the object types within each application vary vastly between various applications. For example: mainframes, enterprise resource planning (ERP)/customer relationship management (CRM)/human capital management (HCM) systems from various vendors, Lightweight Directory Access Protocol (LDAP) systems, database systems, and custom applications have varied ways to manage their users and their permissions within the applications. These varied approaches extend to data oriented applications like Box, Sharepoint etc. To handle these various ways of managing users and their permissions within the applications, the conventional approach to provide governance for these objects is to build connectors that satisfy a common Application Programming Interface (API). The common API is then used by the governance system to communicate with the target system and perform the various create, read, update, and delete (CRUD) operations that result in data mutations (changes in the underlying data). As shown in FIG. 1, an identity management system 100 may include an identity manager or governance system 105 in communication with an identity connector framework 110 comprising a common API 115. The common API 115 is then used by the governance system 105 to communicate with one or more target systems 120 and perform the various create, read, update, and delete (CRUD) operations by way of one or more connectors 125.

However, in the conventional approach each of the target systems 120 needs its' own connector 125 and the functionality provided by this identity connector framework 110 is limited to CRUD, and thus all life cycle operations still need additional layers of software. Moreover, many of the governance functions need multiple target queries. For example, a process flow for analyzing segregation of duties may include examining access information across multiple applications. But doing these queries means synchronizing data in the target systems 120 to the governance system 105 and handling the complexities in keeping the data synchronized (such as periodic data refresh, keeping track of changes and provisioning back to the targets). Even after everything is synchronized to the governance system 105, there is need for additional layers of software to build the actual life cycle management support.

Accordingly, a different approach is needed to address these problems. In various embodiments, a different approach is provided to model the universe of target applications (e.g., the target systems 120) in a uniform way, operate on this model in a uniform manner, and perform governance functions over this model. This approach is referred to herein as "universal governance". The approach may be thought of as a multi-layer approach comprising a first layer or governance layer, a second layer or layer of governance entities, and a third layer or layer of application entities. The first layer is where all of the governance set of capabilities reside. These capabilities can handle object lifecycle for any entity in the below layers. The second layer is where core entities of governance reside. The governance entities are not application specific but still represent information and tasks that enterprise customers have a need to track. For example, an enterprise role might reside in this layer. Parameters such as who created the role, what this role entails, who approved the role, and who last reviewed the role are part of the governance entity. The third layer is where the application specific set of entities reside. These entities model the target application(s). The objects in the target application have relationships between each other and with objects in the second layer. For example, a user Bob Smith (a second layer object) may have an active directory account (a third layer object). It should be understood that these entities of the second and third layer only represent definitions and not the data itself.

Advantageously, this multi-layer approach applies to all entities. For example, as with a relational database management system (RDBMS) where a SQL statement can be used to run against any table created in the database; similarly, the first layer of the core set of governance features can run with any entity in the second layer and the third layer. Such an approach makes the governance capabilities uniformly applicable to all objects. As long as objects and relationships can be represented in the second layer or the third layer, functionality in the first layer does not make a distinction. In other words, the first layer can universally govern any entity. Moreover, there is no need for data synchronization. For example, none of the application objects have to be necessarily synchronized. As operations happen on these entities in the second layer and the third layer, the entities can be translated real time as CRUD operations on the real target applications.

Also advantageously, the schema of the target applications can be enhanced or enriched. For example, since the application entities are mere representations of the real target applications, it is possible to make the schema of the application entities an enriched version of the target applications. So, a create operation on this enriched object could not only create the actual target object, but may be also used to create other artifacts within the governance system. Moreover, the approach can act as an object time machine. For example, as customers interact with the governance system and the governance system can keep track of all object mutations whether the object resides locally or remotely, this allows the governance system to act as an object time machine, being able to track the objects lifecycle history for security and audit perspective. This time machine and policy around lifecycle may be completely transparent to the target applications.

Governance Framework

Figure 2:
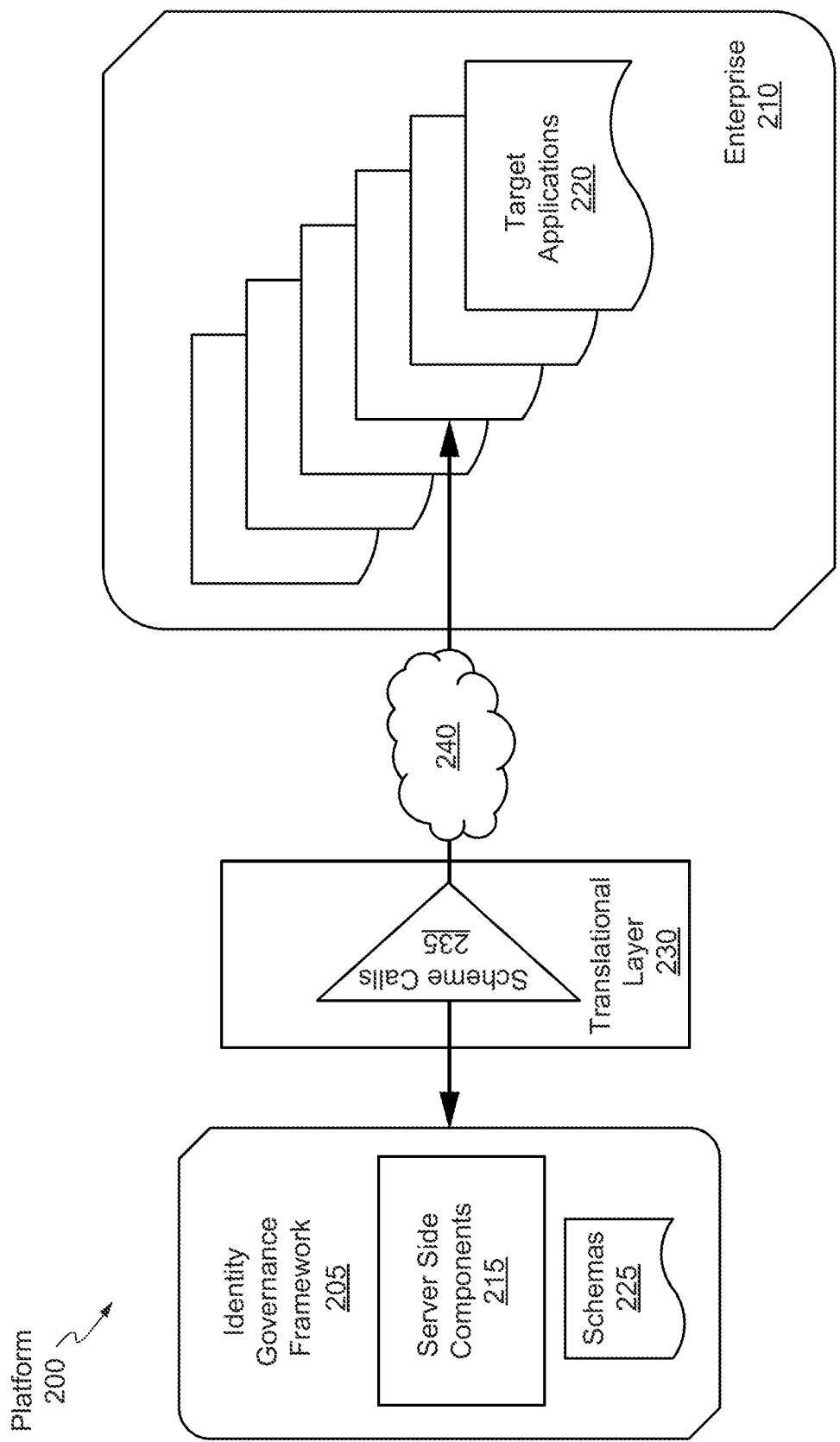
FIG. 2 is an illustration of a universal approach to lifecycle management in accordance with various embodiments.

FIG. 2 illustrates a platform 200 for universal governance. The platform 200 includes an identity governance framework 205 (server side) in communication with one or more enterprise systems 210 (client side). The identity governance framework 205 includes server side components 215 that implement a governance set of capabilities or operations within a governance services layer on objects within a governance entities layer and a target application entities layer, as described with respect to FIG. 3. The governance entities layer includes entities and objects that are not application specific but still represent information and tasks that enterprise customers have a need to track. For example, an enterprise role might reside in this layer, who created the role, what this role entails, who approved the role, and who last reviewed the role are part of the governance requirements. The target application entities layer includes entities and objects that model one or more target applications 220 of the one or more enterprise systems 210 in a uniform way. The entities and objects target application entities layer have relationships between each other and with entities and objects in the governance entities layer. For example, a user Bob Smith (an object from the governance entities layer) may have an Active Directory Account (an object in the target application entities layer). It should be understood, that the entities and objects within these layers only represent definitions and not the data itself found in the target applications 220.

In various embodiments, the server side components 215 can be used to govern or handle object lifecycle for any entity or object in the below layers. In some embodiments, the governance set of capabilities or operations may include: (i) approval and certification of creation, modification and deletion of new entitlements; (ii) approval/certification and segregation of duties for creation, modification and deletion of privileges (a.k.a. entitlement grants); and/or (iii) approval and certification of creation of new applications, modification of existing applications and retiring applications. For example, a user can use the server side components 215 to execute capabilities or operations such as Structured Query Language (SQL) queries or LDAP operations on a target application 220. Upon execution of the capabilities or operations, the identity governance framework 205 obtains a governance specific schema 225 associated with the target application 220. The schema 225 includes a hierarchical relationship between the entities and objects in layers of the identity governance framework 205, which is representative of the organization or structure for the target application 220. The schema 225 may be generated by a user and/or the identity governance framework 205 as entities and/or objects of the layers are created, read, updated, or deleted to dynamically model core entities of governance and the target application 220. With the governance schema 225, it is possible for the server side components 215 to execute the capabilities or operations on the entities and/or objects in the governance entities layer and a target application entities layer.

When the entities and/or objects are queried, created, read, updated, or deleted in the identity governance framework 205 by execution of the capabilities or operations on the entities and/or objects in the governance entities layer and a target application entities layer, a new or updated schema 225 of records is created (all data mutations (e.g., CRUD) in the system may be establishing a new or updated schema). In some instances, the new or updated schema 225 is the same, similar, or different from the original schema 225 used to execute the capabilities or operations on the entities and/or objects in the governance entities layer and a target application entities layer. For example, executing the capabilities or operations on the entities and/or objects may or may not affect a change (e.g., a query operation may not affect a change) in the underlying definition or data, and thus the new or updated schema 225 may be the same, similar, or different from the original schema 225. The new or updated schema 225 of records are then used to run a query or update the real data within the target applications 220, if the target applications 220 have connectivity to the identity governance framework 205. If the target applications 220 are not connected to the identity governance framework 205, an offline mechanism (such as human intervention) may be used to run the query or update the real data within the target applications 220. All of the actual data represented by the entities and/or objects does not need to fetched for each the capabilities or operations and instead only actual data used in the operation need be fetched on demand from the target application 120 as the server side components 115 execute the capabilities or operations on the entities and/or objects in the governance entities layer and a target application entities layer. As each of the target applications 120 is modeled in a uniform way and the capabilities or operations are executed on the entities and/or objects of the model in a uniform way, universal governance over the target applications 120 is possible.

None of the entities and/or objects have to be necessarily synchronized with the target applications 120. As the capabilities or operations are executed on the entities and/or objects, the schema 125 is updated and the capabilities or operations are translated in real time as a query or CRUD operations on the target applications 120. For example, the identity governance framework 105 updates the schema 125 as the capabilities or operations are executed on the entities and/or objects in the layers, and communicates the capabilities or operations and the updated schema 125 for the target application 120 to a translational layer 130. The translational layer 130 reads the capabilities or operations and the updated schema 125, and makes appropriate schema specific calls 135 to the one or more target applications. The calls 135 may be configured using query or operational language for communicating with the one or more target applications 120 such as REST, GraphQL, or any other schema representation language. The calls 125 are configured to perform the capabilities or operations on data (the real data in the target applications 120) represented by the entities and/or objects of the schema 125 at the client side, for example at the target application 120. The translational layer 130 is in communication with the target applications 120 via a communications network 140. Examples of communication networks 140 may include a mobile network, a wireless network, a cellular network, a local area network (LAN), a wide area network (WAN), other wireless communication networks, or combinations thereof.

In various embodiments, since the entities and/or objects are mere representations of the real target applications 120, it is possible to make the schema 125 of each target application 120 an enriched version of the target application 120. For example, a create operation on an enriched object could not only create the actual target object, but also create other artifacts within the identity governance framework 105 (artifacts not necessarily a part of the target application). Moreover, since the operations are performed on the entities and/or objects as the users interact with the identity governance framework 105, the identity governance framework 105 may keep track of all object mutations whether the object resides locally or remotely. This allows the identity governance framework 105 to act as an object time machine, being able to track the objects lifecycle history for security and audit perspective. This time machine and policy around lifecycle are completely transparent to the target applications 120.

Figure 3:
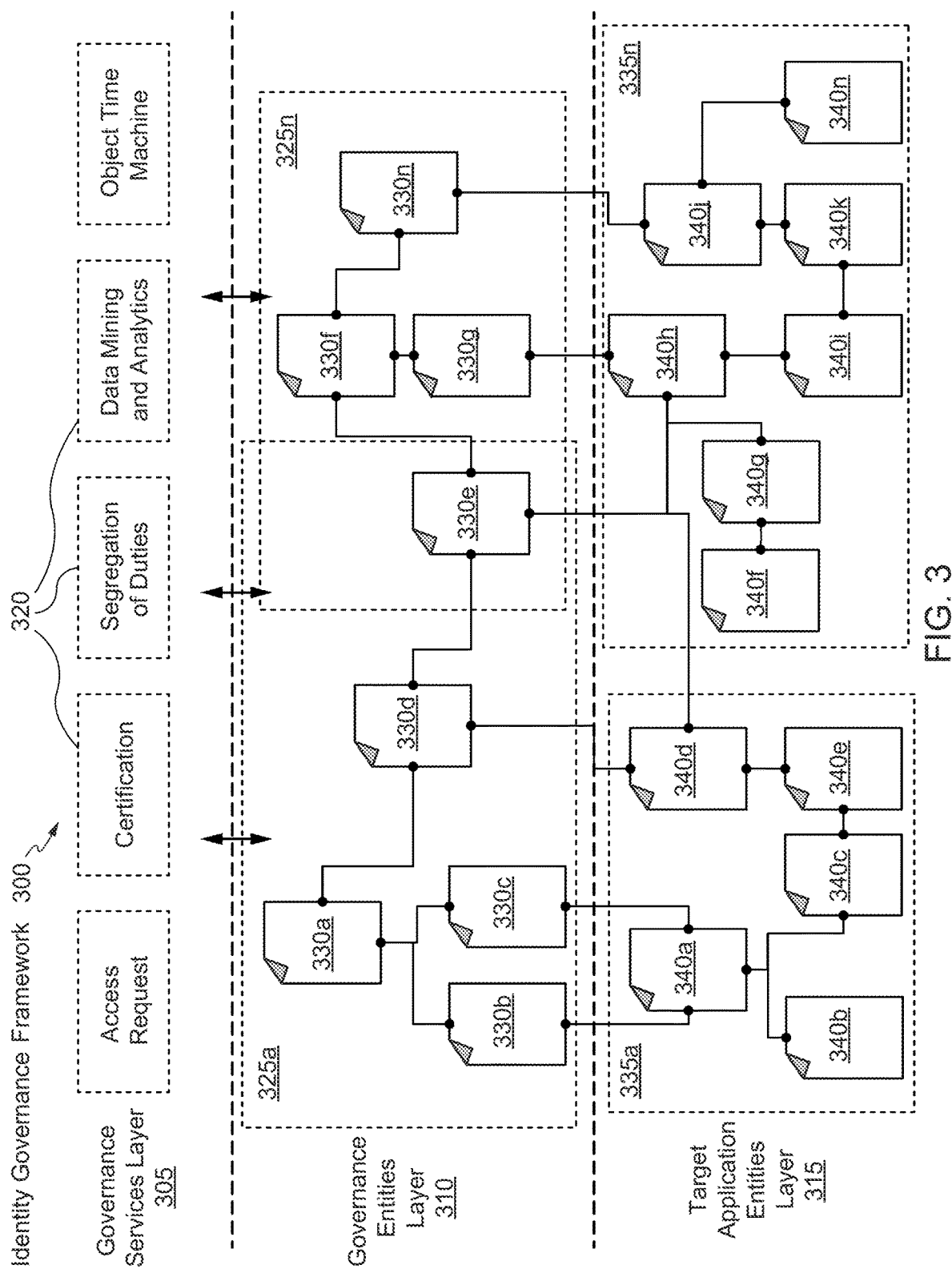
FIG. 3 illustrates a identity governance framework in accordance with various embodiments.

As shown in FIG. 3, a governance framework 300 (e.g., identity governance framework 105 as described with respect to FIG. 2) may include a governance services layer 305, a governance entities layer 310, and a target application entities layer 315. In various embodiments, each enterprise unit (e.g., a company) has different instantiation of a governance services layer 305, a governance entities layer 310, and a target application entities layer 315. The governance services layer 305 includes a governance set of capabilities or operations 320 for the enterprise unit. In some embodiments, the capabilities include: (i) access request, e.g., the ability to determine who is accessing what and when, (ii) certification, e.g., do we have an approval trail for the access, who approved the access and when, was the approval reviewed, should the access have been further reviewed or has the access expired, etc., (iii) segregation of duties, e.g., is there a conflict of access over multiple applications, (iv) data mining and analytics, e.g., how often is a user accessing a resource, from where is a resource typically accessed, how are resources being accessed, have authentication privileges been granted in higher/lower numbers of a certain period of time, etc., and (v) object time machine, e.g., can look back at the life of an object and track an objects lifecycle history for security and audit purposes.

The governance entities layer 310 includes a core set of governance entities 325*a-n* ('n' represents any natural number) for the enterprise unit. The governance entities 325*a-n* are not application specific but still represent information and tasks that enterprise customers have a need to track. For example, governance entities 325*a-n* may be policy objects like enterprise roles. Parameters such as who created the role, what this role entails, who approved the role, and who last reviewed the role are part of the governance entities 325*a-n*. The target application entities layer 315 is where the application specific set of entities 335*a-n* reside, which model corresponding target applications a . . . n that the enterprise unit is interested in governing. The entities 335*a-n* model the target application(s) using objects 340*a-n*. The objects 340*a-n* in the target application entities layer 315 have relationships between each other and with objects 330*a-n* in the governance entities layer 310. For example, mutations (e.g., CRUD operations on the entities or objects) to governance entities 325*a-n* such as enterprise roles can cause mutations to objects 340*a-n* of entities 335*a-n*, which model the target application(s). The relationships of the objects in the target application entities layer 315 and between the objects in layer governance entities layer 310 and layer the target application entities layer 315 are represented as nodes of a hierarchical tree with branches showing the links/relationships between each object. For example, object 205 may represent a role of a specific user 210 with an active directory account for an active directory application 215, which includes an active directory group 220, active directory organization 225, and active directory group membership 230.

The representations between the objects 330; 340 expose the schema for the organization or structure of a target application in a uniform way such that the governance set of capabilities from the governance services layer 305 can operate on the entities 325; 335 and/or objects 330; 340 in the governance entities layer 310 and target application entities layer 315. As long as the objects 330; 340 and relationships can be represented in the governance entities layer 310 and target application entities layer 315, functionality in the governance services layer 305 does not make a distinction. In other words, the governance services layer 305 can universally govern any entity 325; 335. In various embodiments, the object models are provided in a schema for each target application, for example as a layer over each application. In some embodiments, a core set of applications are provided to enterprise units with a schema for each application that includes the objects already mapped out in a hierarchical tree. In other embodiments, a user can design a schema for each application (e.g., a custom application) that includes the objects mapped out in a hierarchical tree.

With the governance specific schemas, it is possible to perform the capabilities or operations on the entities 325; 335 and objects 330; 340 in the governance entities layer 310 and target application entities layer 315 from the governance services layer 305. All of the actual data represented by the objects 330, 340 does not need to fetched for each capability or operation and instead only actual data used in the capability or operation need be fetched on demand as the governance services layer 305 performs the governance capabilities or operations. For example, if a query is run using the governance services layer 305 that includes: I want to know everyone that has a role because only people with the role should be permitted to have access to this application. All of the data represented by role objects does not need to be present in the governance framework 300 or distributed environment (e.g., cloud environment) associated with the governance framework 300. Instead, the governance services layer 305 is used to execute the query, a translation layer fetches actual data used in the capability or operation from the target application in order to execute the query on the entities 325; 335 and objects 330; 340, subsequently the translation layer receives the schema or an updated scheme based on the execution of the query or CRUD operations, and the translation layer knows how to convert application or system specific queries or CRUD operations that are transmitted to the applications or systems of the enterprise (e.g., API call such as REST, GraphQL, or any other schema representation language). Not only can the queries or CRUD operations be performed on the data outside of the governance framework 300 but the governance framework 300 can perform the queries or CRUD operations on the entities 325; 335 and objects 330; 340 locally or remotely to the governance framework 300.

FIG. 3 shows an exemplary schema or hierarchical organization of entities 325; 335 and objects 330; 340 for one or more target applications. This organization is manifested at runtime. Runtime refers to the instantiation of programming components when the governance framework 300 is executed. For instance, in the exemplary and non-limiting case of an object-oriented programming paradigm, runtime can involve creating objects as needed from a collection of classes, storing the objects in a memory heap, reading and updating the objects as needed, and then removing the objects when they are no longer in use. In this case, the organization of entities 325; 335 and objects 330; 340 is manifested in the relationship between objects in memory as the governance framework 300 is being run to govern the one or more target applications. Generally, entities 325; 335 and objects 330; 340 implement different aspects of governance for any kind of application. For instance, in the object-oriented paradigm, the objects 330; 340 may correspond to separate objects (instances) of classes, which have various methods and associated properties for performing various tasks within the target applications. In the specific case of an application that provides payroll services, separate objects 330 may provide users (e.g., Bob Smith) and separate objects 340 may provide different features (e.g., active directory account) for a payroll application. In the payroll application, the separate objects 340 may provide different features of the program's accounting functionality, and so forth. These are merely illustrative and non-limiting examples of a vast number of applications that the governance framework 300 can be applied to.

The governance framework 300 has a hierarchical construction. That is, the entities 325; 335 and objects 330; 340 in the governance framework 300 are coupled to one another in a parent-child relationship (as well as peer-to-peer relationship). To implement this organization, the governance framework 300 includes various kinds of objects 330; 340. For example, some objects such as object 340b are leaves and lack children while other objects such as object 330a or 340a are branches and have children. Objects such as 340h-n that are linked within a specific entity domain such as entity 335n include composite functionality that allows the objects to function as a group. Namely, composite functionality defines a composite grouping, including exemplary objects. The composite functionality in governance entities layer 310 provides hierarchical information and tasks that enterprise customers have a need to track within entities, while in the target application entities layer 315, the composite functionality can mirror real functionality of a target application represented by an entity. As should be understood, FIG. 3 may represent only a small fragment of a more encompassing governance framework 300. For instance, the composite functionality provided by objects 330f-n may couple to still higher levels (not shown), and the composite functionality provided by objects 340f-h may couple to still lower levels (not shown). Note that the term "higher" is shorthand metaphorical reference to further enclosing domains (e.g., parent and ancestors levels), while the term "lower" is shorthand metaphorical reference to further nested domains (e.g., child levels); strictly speaking, a programming environment does not discriminate between "up" and "down."

Identity Management System with Universal Governance Processing

Figure 4:
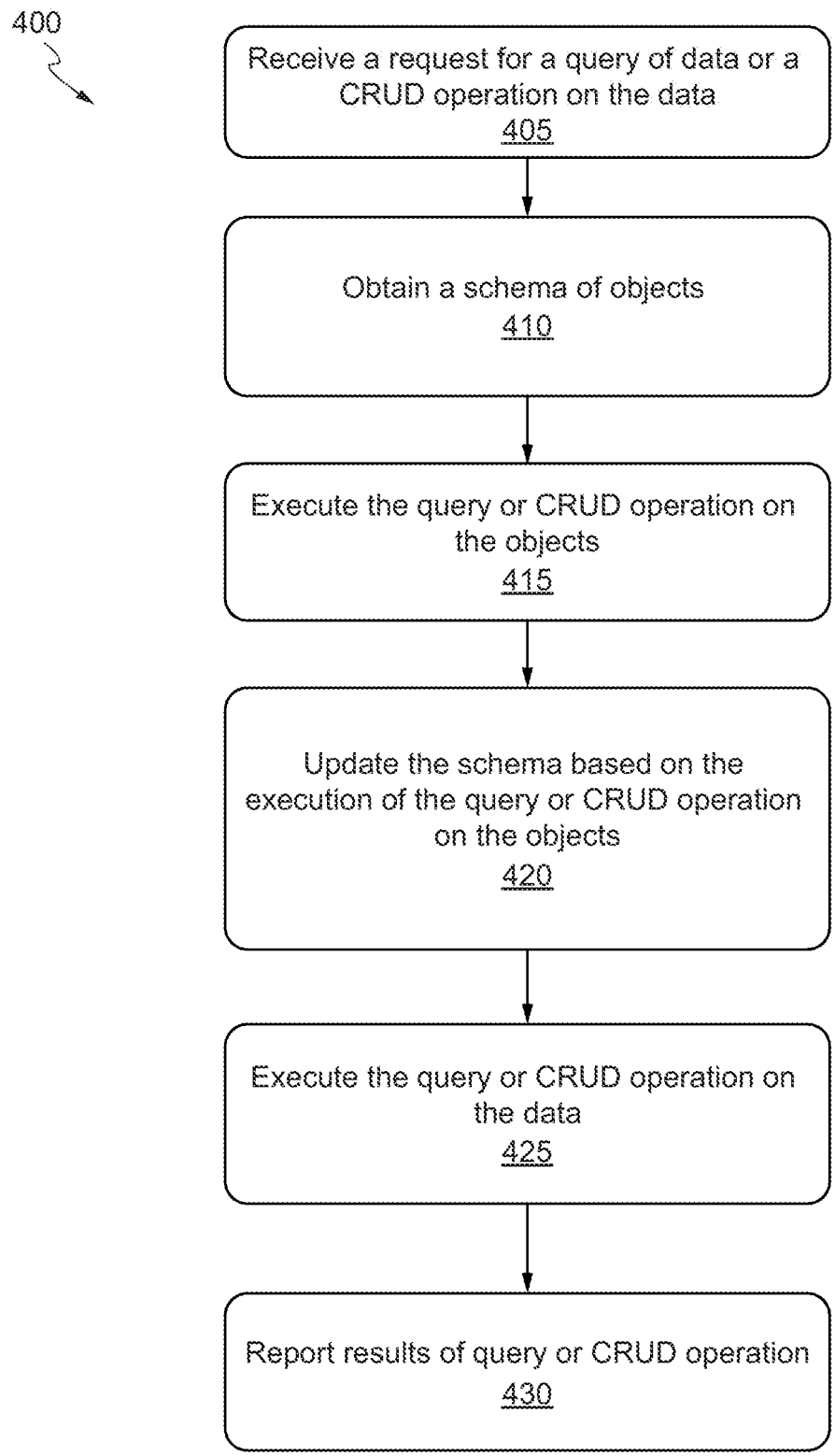
FIG. 4 depicts a flowchart illustrating a process for universal governance in accordance with various embodiments.

FIG. 4 illustrates processes and operations for universal governance. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes and/or operations depicted in FIG. 4 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIG. 4 is not intended to be limiting. Other sequences of steps may also be performed according to alternative embodiments. For example, in alternative embodiments the steps outlined above may be performed in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 4 shows a flowchart 400 that illustrates a process for universal governance. In some embodiments, the processes depicted in flowchart 400 may be implemented by the architecture and process flows depicted in FIGS. 2 and 3. At step 405, a request for a query of data or a CRUD operation on the data is received. The data is part of a target application. In some embodiments, the target application is implemented by an enterprise. At step 410, a schema of objects associated with the target application is obtained. The schema models a relationship between the objects, and the objects represent at least the data of the target. At step 415, the query or CRUD operation is executed on the objects based on the schema. At step 420, the schema is updated to account for the query or CRUD operation on the objects. As used herein, when an action is "based on" something, this means the action is based at least in part on at least a part of the something.

At step 425, the query or CRUD operation is executed on the data based on the schema. In some instances, the schema used to execute the query or CRUD operation on the data is the same, similar, or different from the schema used to execute the query or CRUD operation on the objects. In certain instances, the schema used to execute the query or CRUD operation on the data is the updated schema from step 420. In some embodiments, the executing includes translating the query or CRUD operation into one or more schema specific calls to the target application based on the schema or updated schema. The calls are configured to execute the query or the CRUD on the data of the one or more enterprise applications in accordance with the schema or updated schema of objects. At step 430, results of the query or CRUD operation are reported to a user. In some embodiments, the reporting the query or CRUD operation includes reporting all object mutations performed on the data associated with the objects over a lifecycle of the objects.

Illustrative Systems

Figure 5:
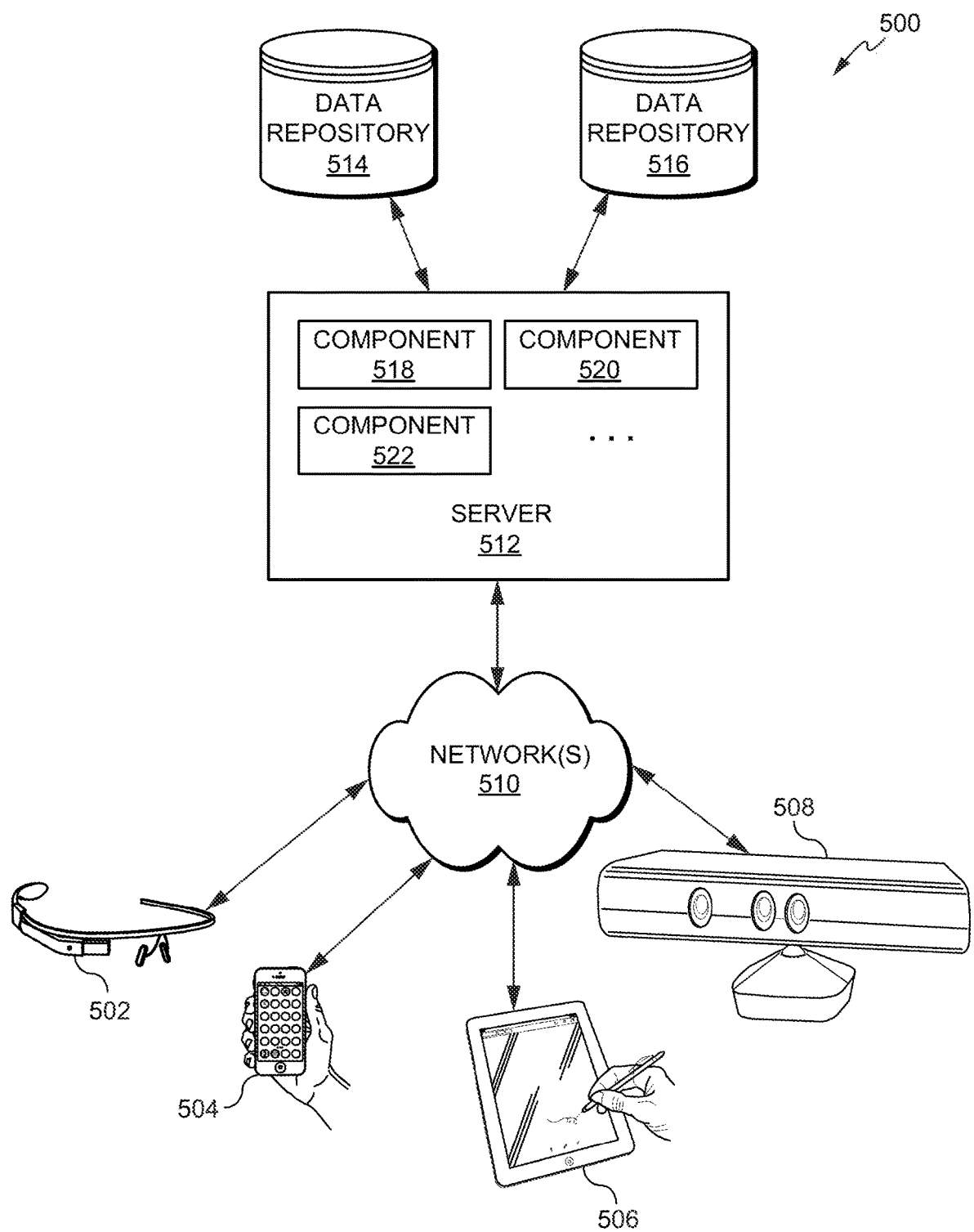
FIG. 5 depicts a simplified diagram of a distributed system for implementing various embodiments.

FIG. 5 depicts a simplified diagram of a distributed system 500 for implementing an embodiment. In the illustrated embodiment, distributed system 500 includes one or more client computing devices 502, 504, 506, and 508, coupled to a server 512 via one or more communication networks 510. Clients computing devices 502, 504, 506, and 508 may be configured to execute one or more applications.

In various embodiments, server 512 may be adapted to run one or more services or software applications that enable performing universal identity management or governance over a wide variety of applications.

In certain embodiments, server 512 may also provide other services or software applications that can include non-virtual and virtual environments. In some embodiments, these services may be offered as web-based or cloud services, such as under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in FIG. 5, server 512 may include one or more components 518, 520 and 522 that implement the functions performed by server 512. These components may include software components that may be executed by one or more processors, hardware components, or combinations thereof. It should be appreciated that various different system configurations are possible, which may be different from distributed system 500. The embodiment shown in FIG. 5 is thus one example of a distributed system for implementing an embodiment system and is not intended to be limiting.

Users may use client computing devices 502, 504, 506, and/or 508 to perform universal identity management or governance over a wide variety of applications in accordance with the teachings of this disclosure. A client device may provide an interface that enables a user of the client device to interact with the client device. The client device may also output information to the user via this interface. Although FIG. 5 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 510 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like.

Merely by way of example, network(s) 510 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth*, and/or any other wireless protocol), and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 512 can include one or more virtual machines running virtual operating systems, or other computing architectures involving virtualization such as one or more flexible pools of logical storage devices that can be virtualized to maintain virtual storage devices for the server. In various embodiments, server 512 may be adapted to run one or more services or software applications that provide the functionality described in the foregoing disclosure.

The computing systems in server 512 may run one or more operating systems including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more data repositories 514, 516. These data repositories may be used to store data and other information in certain embodiments. For example, one or more of the data repositories 514, 516 may be used to store information for performing universal identity management or governance. Data repositories 514, 516 may reside in a variety of locations. For example, a data repository used by server 512 may be local to server 512 or may be remote from server 512 and in communication with server 512 via a network-based or dedicated connection. Data repositories 514, 516 may be of different types. In certain embodiments, a data repository used by server 512 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 514, 516 may also be used by applications to store application data. The data repositories used by applications may be of different types such as, for example, a key-value store repository, an object store repository, or a general storage repository supported by a file system.

Figure 6:
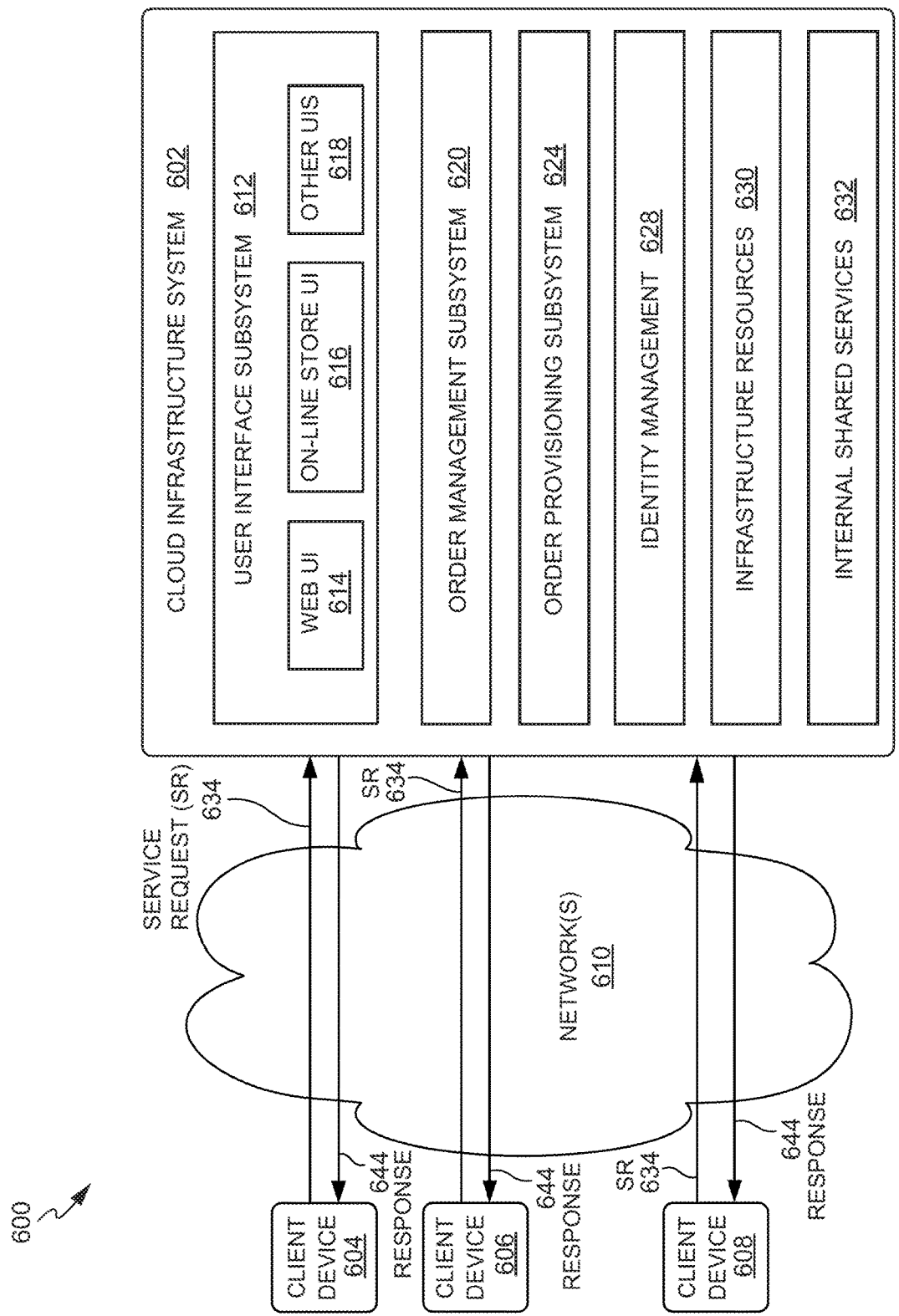
FIG. 6 is a simplified block diagram of one or more components of a system environment by which services provided by one or more components of an embodiment system may be offered as cloud services, in accordance with various embodiments.

In certain embodiments, the performing universal identity management or governance over a wide variety of applications described in this disclosure may be offered as services via a cloud environment. FIG. 6 is a simplified block diagram of a cloud-based system environment in which the performing universal identity management or governance may be offered as cloud services, in accordance with certain embodiments. In the embodiment depicted in FIG. 6, cloud infrastructure system 602 may provide one or more cloud services that may be requested by users using one or more client computing devices 604, 606, and 608. Cloud infrastructure system 602 may comprise one or more computers and/or servers that may include those described above for server 512. The computers in cloud infrastructure system 602 may be organized as general purpose computers, specialized server computers, server farms, server clusters, or any other appropriate arrangement and/or combination.

Network(s) 610 may facilitate communication and exchange of data between clients 604, 606, and 608 and cloud infrastructure system 602. Network(s) 610 may include one or more networks. The networks may be of the same or different types. Network(s) 610 may support one or more communication protocols, including wired and/or wireless protocols, for facilitating the communications.

The embodiment depicted in FIG. 6 is only one example of a cloud infrastructure system and is not intended to be limiting. It should be appreciated that, in some other embodiments, cloud infrastructure system 602 may have more or fewer components than those depicted in FIG. 6, may combine two or more components, or may have a different configuration or arrangement of components. For example, although FIG. 6 depicts three client computing devices, any number of client computing devices may be supported in alternative embodiments.

The term cloud service is generally used to refer to a service that is made available to users on demand and via a communication network such as the Internet by systems (e.g., cloud infrastructure system 602) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 602 may provide one or more cloud services using different models such as under a Software as a Service (SaaS) model, a Platform as a Service (PaaS) model, an Infrastructure as a Service (IaaS) model, and others, including hybrid service models. Cloud infrastructure system 602 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 602. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 602. Cloud infrastructure system 602 then performs processing to provide the services requested in the customer's subscription order. For example, performing universal identity management or governance over a wide variety of applications. Cloud infrastructure system 602 may be configured to provide one or even multiple cloud services.

Cloud infrastructure system 602 may provide the cloud services via different deployment models. In a public cloud model, cloud infrastructure system 602 may be owned by a third party cloud services provider and the cloud services are offered to any general public customer, where the customer can be an individual or an enterprise. In certain other embodiments, under a private cloud model, cloud infrastructure system 602 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 602 and the services provided may be shared by several organizations in a related community. Various other models such as hybrids of the above mentioned models may also be used.

Client computing devices 604, 606, and 608 may be of different types (such as devices 502, 504, 506, and 508 depicted in FIG. 5) and may be capable of operating one or more client applications. A user may use a client device to interact with cloud infrastructure system 602, such as to request a service provided by cloud infrastructure system 602. For example, a user may use a client device to perform universal identity management or governance described in this disclosure.

In some embodiments, the processing performed by cloud infrastructure system 602 for providing universal identity management or governance may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 602 for performing universal identity management or governance over a wide variety of applications. The data used for this analysis may include structured data (e.g., data stored in a database or structured according to a structured model) and/or unstructured data (e.g., data blobs (binary large objects)).

As depicted in the embodiment in FIG. 6, cloud infrastructure system 602 may include infrastructure resources 630 that are utilized for facilitating the provision of various cloud services offered by cloud infrastructure system 602. Infrastructure resources 630 may include, for example, processing resources, storage or memory resources, networking resources, and the like.

In certain embodiments, to facilitate efficient provisioning of these resources for supporting the various cloud services provided by cloud infrastructure system 602 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 602 may itself internally use services 632 that are shared by different components of cloud infrastructure system 602 and which facilitate the provisioning of services by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 602 may comprise multiple subsystems. These subsystems may be implemented in software, or hardware, or combinations thereof. As depicted in FIG. 6, the subsystems may include a user interface subsystem 612 that enables users or customers of cloud infrastructure system 602 to interact with cloud infrastructure system 602. User interface subsystem 612 may include various different interfaces such as a web interface 614, an online store interface 616 where cloud services provided by cloud infrastructure system 602 are advertised and are purchasable by a consumer, and other interfaces 618. For example, a customer may, using a client device, request (service request 634) one or more services provided by cloud infrastructure system 602 using one or more of interfaces 614, 616, and 618. For example, a customer may access the online store, browse cloud services offered by cloud infrastructure system 602, and place a subscription order for one or more services offered by cloud infrastructure system 602 that the customer wishes to subscribe to. The service request may include information identifying the customer and one or more services that the customer desires to subscribe to. For example, a customer may place a subscription order for universal identity management or governance service offered by cloud infrastructure system 602. As part of the order, the customer may provide information identifying complex and time-sensitive business scenarios to be solved.

In certain embodiments, such as the embodiment depicted in FIG. 6, cloud infrastructure system 602 may comprise an order management subsystem (OMS) 620 that is configured to process the new order. As part of this processing, OMS 620 may be configured to: create an account for the customer, if not done already; receive billing and/or accounting information from the customer that is to be used for billing the customer for providing the requested service to the customer, verify the customer information; upon verification, book the order for the customer; and orchestrate various workflows to prepare the order for provisioning.

Once properly validated, OMS 620 may then invoke the order provisioning subsystem (OPS) 624 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 624 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 602 may send a response or notification 644 to the requesting customer to indicate when the requested service is now ready for use. In some instances, information (e.g., a link) may be sent to the customer that enables the customer to start using and availing the benefits of the requested services. In certain embodiments, for a customer requesting a universal identity management or governance service, the response may include a request for complex and time-sensitive business scenarios to be solved.

Cloud infrastructure system 602 may provide services to multiple customers. For each customer, cloud infrastructure system 602 is responsible for managing information related to one or more subscription orders received from the customer, maintaining customer data related to the orders, and providing the requested services to the customer. Cloud infrastructure system 602 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 602 may provide services to multiple customers in parallel. Cloud infrastructure system 602 may store information for these customers, including possibly proprietary information. In certain embodiments, cloud infrastructure system 602 comprises an identity management subsystem (IMS) 628 that is configured to manage customers information and provide the separation of the managed information such that information related to one customer is not accessible by another customer. IMS 628 may be configured to provide various security-related services such as identity services, such as information access management, authentication and authorization services, services for managing customer identities and roles and related capabilities, and the like.

Figure 7:
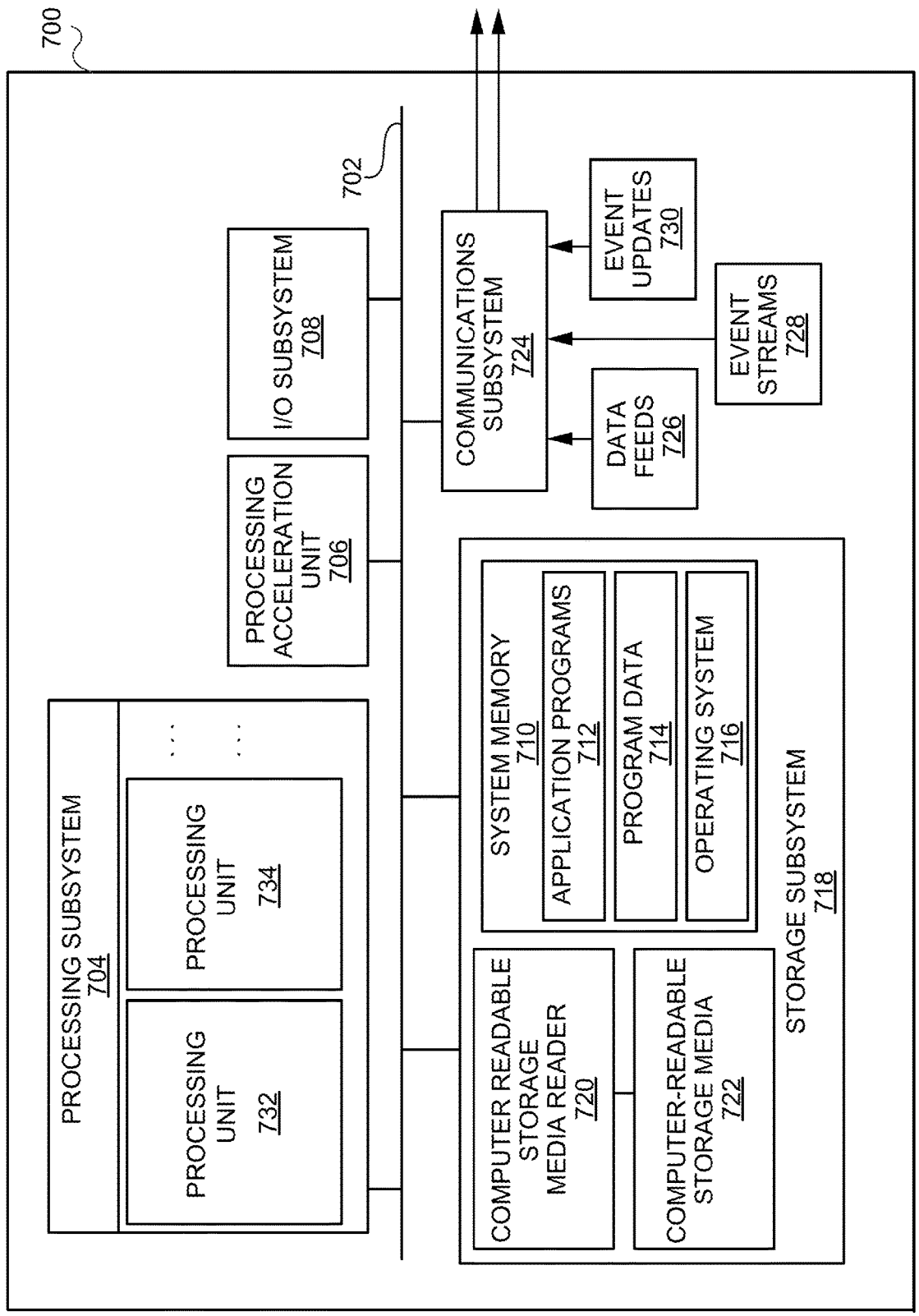
FIG. 7 illustrates an example computer system that may be used to implement various embodiments.

FIG. 7 illustrates an exemplary computer system 700 that may be used to implement certain embodiments. For example, in some embodiments, computer system 700 may be used to implement any of the universal identity management or governance processing systems, identity management systems, and various servers and computer systems described above. As shown in FIG. 7, computer system 700 includes various subsystems including a processing subsystem 704 that communicates with a number of other subsystems via a bus subsystem 702. These other subsystems may include a processing acceleration unit 706, an I/O subsystem 708, a storage subsystem 718, and a communications subsystem 724. Storage subsystem 718 may include non-transitory computer-readable storage media including storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processors, application specific integrated circuits (ASICs), or field programmable gate arrays (FPGAs). The processors may include be single core or multicore processors. The processing resources of computer system 700 can be organized into one or more processing units 732, 734, etc. A processing unit may include one or more processors, one or more cores from the same or different processors, a combination of cores and processors, or other combinations of cores and processors. In some embodiments, processing subsystem 704 can include one or more special purpose co-processors such as graphics processors, digital signal processors (DSPs), or the like. In some embodiments, some or all of the processing units of processing subsystem 704 can be implemented using customized circuits, such as application specific integrated circuits (ASICs), or field programmable gate arrays (FPGAs).

In some embodiments, the processing units in processing subsystem 704 can execute instructions stored in system memory 710 or on computer readable storage media 722. In various embodiments, the processing units can execute a variety of programs or code instructions and can maintain multiple concurrently executing programs or processes. At any given time, some or all of the program code to be executed can be resident in system memory 710 and/or on computer-readable storage media 722 including potentially on one or more storage devices. Through suitable programming, processing subsystem 704 can provide various functionalities described above. In instances where computer system 700 is executing one or more virtual machines, one or more processing units may be allocated to each virtual machine.

In certain embodiments, a processing acceleration unit 706 may optionally be provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term input device is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 700 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 718 provides a repository or data store for storing information and data that is used by computer system 700. Storage subsystem 718 provides a tangible non-transitory computer-readable storage medium for storing the basic programming and data constructs that provide the functionality of some embodiments. Storage subsystem 718 may store software (e.g., programs, code modules, instructions) that when executed by processing subsystem 704 provides the functionality described above. The software may be executed by one or more processing units of processing subsystem 704. Storage subsystem 718 may also provide a repository for storing data used in accordance with the teachings of this disclosure.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM), dynamic random access memory (DRAM), and the like.

By way of example, and not limitation, as depicted in FIG. 7, system memory 710 may load application programs 712 that are being executed, which may include various applications such as Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 722 may store programming and data constructs that provide the functionality of some embodiments. Computer-readable media 722 may provide storage of computer-readable instructions, data structures, program modules, and other data for computer system 700. Software (programs, code modules, instructions) that, when executed by processing subsystem 704 provides the functionality described above, may be stored in storage subsystem 718. By way of example, computer-readable storage media 722 may include non-volatile memory such as a hard disk drive, a magnetic disk drive, an optical disk drive such as a CD ROM, DVD, a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 718 may also include a computer-readable storage media reader 720 that can further be connected to computer-readable storage media 722. Reader 720 may receive and be configured to read data from a memory device such as a disk, a flash drive, etc.

In certain embodiments, computer system 700 may support virtualization technologies, including but not limited to virtualization of processing and memory resources. For example, computer system 700 may provide support for executing one or more virtual machines. In certain embodiments, computer system 700 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 700. Accordingly, multiple operating systems may potentially be run concurrently by computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices. For example, the communication subsystem may be used to obtain a schema for performing universal identity management or governance over a wide variety of applications.

Communication subsystem 724 may support both wired and/or wireless communication protocols. For example, in certain embodiments, communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

Communication subsystem 724 can receive and transmit data in various forms. For example, in some embodiments, in addition to other forms, communications subsystem 724 may receive input communications in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 724 may also be configured to communicate data from computer system 700 to other computer systems or networks. The data may be communicated in various different forms such as structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
   receiving, at a data processing system, a request for a query of data or a CRUD operation on the data, wherein the data is part of a target application governed by an enterprise using a governance framework comprising a governance services layer, a governance entities layer, and a target application entities layer;
   obtaining, by the data processing system from the governance framework, a schema of objects associated with the target application, wherein:
      the schema is an enriched version of the target application that models a relationship between the objects,
      the objects are comprised of application non-specific objects and application specific objects,
      the application non-specific objects reside within the governance entities layer and represent information and tasks to be tracked within the enterprise that are not specific to the target application;
      the application specific objects reside within the within the target application entities layer and represent the data of the target application, and
      the application specific objects have relationships between each other and with the non-application specific objects;
   executing, by the data processing system using the governance services layer, the query or CRUD operation on the application specific objects, the application non-specific objects, or a combination thereof based on the schema;
   updating, by the data processing system using the governance services layer, the schema to account for executing the query or CRUD operation on the application specific objects, the application non-specific objects, or the combination thereof;
   executing, by the data processing system using the governance services layer, the query or CRUD operation on the data, the information and tasks, or a combination thereof based on the updated schema, wherein the executing the query or CRUD operation on the data, the information and tasks, or the combination thereof includes translating the query or CRUD operation into one or more schema specific calls to the target application; and
   reporting, by the data processing system using the governance services layer, results of the query or CRUD operation on the data.

2. The method of claim 1, wherein the calls are configured to execute the query or the CRUD operation on the data of the target application in accordance with the updated schema.

3. The method of claim 1, wherein the reporting the results of the query or CRUD operation includes reporting all object mutations performed on the data, the information and tasks, or the combination thereof over a lifecycle of the objects.

4. A non-transitory computer-readable memory storing a plurality of instructions executable by one or more processors, the plurality of instructions comprising instructions that when executed by the one or more processors cause the one or more processors to perform processing comprising:
   receiving, at a data processing system, a request for a query of data or a CRUD operation on the data, wherein the data is part of a target application governed by an enterprise using a governance framework comprising a governance services layer, a governance entities layer, and a target application entities layer;
   obtaining, by the data processing system from the governance framework, a schema of objects associated with the target application, wherein:
      the schema is an enriched version of the target application that models a relationship between the objects,
      the objects are comprised of application non-specific objects and application specific objects, and
      the application non-specific objects reside within the governance entities layer and represent information and tasks to be tracked within the enterprise that are not specific to the target application;
      the application specific objects reside within the within the target application entities layer and represent the data of the target application, and
      the application specific objects have relationships between each other and with the non-application specific objects;
   executing, by the data processing system using the governance services layer, the query or CRUD operation on the application specific objects, the application non-specific objects, or a combination thereof based on the schema;
   updating, by the data processing system using the governance services layer, the schema to account for executing the query or CRUD operation on the application specific objects, the application non-specific objects, or the combination thereof;
   executing, by the data processing system using the governance services layer, the query or CRUD operation on the data, the information and tasks, or a combination thereof based on the updated schema, wherein the executing the query or CRUD operation on the data, the information and tasks, or the combination thereof includes translating the query or CRUD operation into one or more schema specific calls to the target application; and reporting, by the data processing system using the governance services layer, results of the query or CRUD operation on the data.

5. The non-transitory computer-readable memory of claim 4, wherein the calls are configured to execute the query or the CRUD operation on the data of the target application in accordance with the updated schema.

6. The non-transitory computer-readable memory of claim 4, wherein the reporting the results of the query or CRUD operation includes reporting all object mutations performed on the data, the information and tasks, or the combination thereof over a lifecycle of the objects.

7. A system comprising:
one or more processors; and
a memory coupled to the one or more processors, the memory storing a plurality of instructions executable by the one or more processors, the plurality of instructions comprising instructions that when executed by the one or more processors cause the one or more processors to perform processing comprising:
receiving a request for a query of data or a CRUD operation on the data, wherein the data is part of a target application governed by an enterprise using a governance framework comprising a governance services layer, a governance entities layer, and a target application entities layer;
obtaining, from the governance framework, a schema of objects associated with the target application, wherein:
the schema is an enriched version of the target application that models a relationship between the objects,
the objects are comprised of application non-specific objects and application specific objects, and
the application non-specific objects reside within the governance entities layer and represent information and tasks to be tracked within the enterprise that are not specific to the target application;
the application specific objects reside within the within the target application entities layer and represent the data of the target application, and
the application specific objects have relationships between each other and with the non-application specific objects;
executing, using the governance services layer, the query or CRUD operation on the application specific objects, the application non-specific objects, or a combination thereof based on the schema;
updating, using the governance services layer, the schema to account for executing the query or CRUD operation on the application specific objects, the application non-specific objects, or the combination thereof;
executing, using the governance services layer, the query or CRUD operation on the data, the information and tasks, or a combination thereof based on the updated schema, wherein the executing the query or CRUD operation on the data, the information and tasks, or the combination thereof includes translating the query or CRUD operation into one or more schema specific calls to the target application; and
reporting, using the governance services layer, results of the query or CRUD operation on the data.

8. The system of claim 7, wherein the calls are configured to execute the query or the CRUD operation on the data of the target application in accordance with the updated schema.

9. The system of claim 7, wherein the reporting the results of the query or CRUD operation includes reporting all object mutations performed on the data, the information and tasks, or the combination thereof over a lifecycle of the objects.

* * * * *

UNITED STATES PATENT AND TRADEMARK OFFICE
CERTIFICATE OF CORRECTION

| | | |
|---|---|---|
| PATENT NO. | : 11,314,611 B2 | Page 1 of 1 |
| APPLICATION NO. | : 16/657030 | |
| DATED | : April 26, 2022 | |
| INVENTOR(S) | : Peddibhotla et al. | |

It is certified that error appears in the above-identified patent and that said Letters Patent is hereby corrected as shown below:

In the Specification

In Column 9, Line 36, delete "330, 340" and insert -- 330; 340 --, therefor.

In the Claims

In Column 23, Lines 52-53, in Claim 1, delete "within the within the" and insert -- within the --, therefor.

In Column 24, Lines 46-47, in Claim 4, delete "within the within the" and insert -- within the --, therefor.

In Column 26, Lines 5-6, in Claim 7, delete "within the within the" and insert -- within the --, therefor.

Signed and Sealed this
Thirtieth Day of August, 2022

Katherine Kelly Vidal
*Director of the United States Patent and Trademark Office*